(12) United States Patent  
Gicquel et al.

(10) Patent No.: US 10,191,589 B2  
(45) Date of Patent: Jan. 29, 2019

(54) SAMPLING FREQUENCY AND ACCUMULATOR SWEEPING IN A TOUCH SCREEN CONTROLLER

(71) Applicant: STMicroelectronics Asia Pacific Pte Ltd, Singapore (SG)

(72) Inventors: Hugo Gicquel, Singapore (SG); Chee Weng Cheong, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 189 days.

(21) Appl. No.: 15/235,974

(22) Filed: Aug. 12, 2016

(65) Prior Publication Data

US 2018/0046320 A1    Feb. 15, 2018

(51) Int. Cl.
*G06F 3/00* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04108* (2013.01)

(58) Field of Classification Search
CPC ......... G06F 2203/04108; G06F 3/0418; G06F 3/044

See application file for complete search history.

(56) References Cited

U.S. PATENT DOCUMENTS

| | | | |
|---|---|---|---|
| 2013/0221993 A1 | 8/2013 | Ksondzyk et al. | |
| 2015/0222256 A1* | 8/2015 | Sasai | H03K 5/1252 327/551 |
| 2017/0139501 A1* | 5/2017 | Dinu | G06F 3/044 |

* cited by examiner

*Primary Examiner* — Muhammad N Edun
(74) *Attorney, Agent, or Firm* — Crowe & Dunlevy

(57) ABSTRACT

A circuit described herein includes a charge to voltage converter circuit having an input coupled to receive a sense signal from a sense node associated with a mutual capacitance to be sensed, and an output. A reset switch is coupled between the output of the charge to voltage converter circuit and the input of the charge to voltage converter. An accumulator circuit is configured to accumulate voltages at the output of the charge to voltage converter circuit and to generate an accumulator output signal. Control circuitry is configured to generate control signals for the reset switch and accumulator circuit so as to reduce noise in the accumulator output signal.

31 Claims, 13 Drawing Sheets

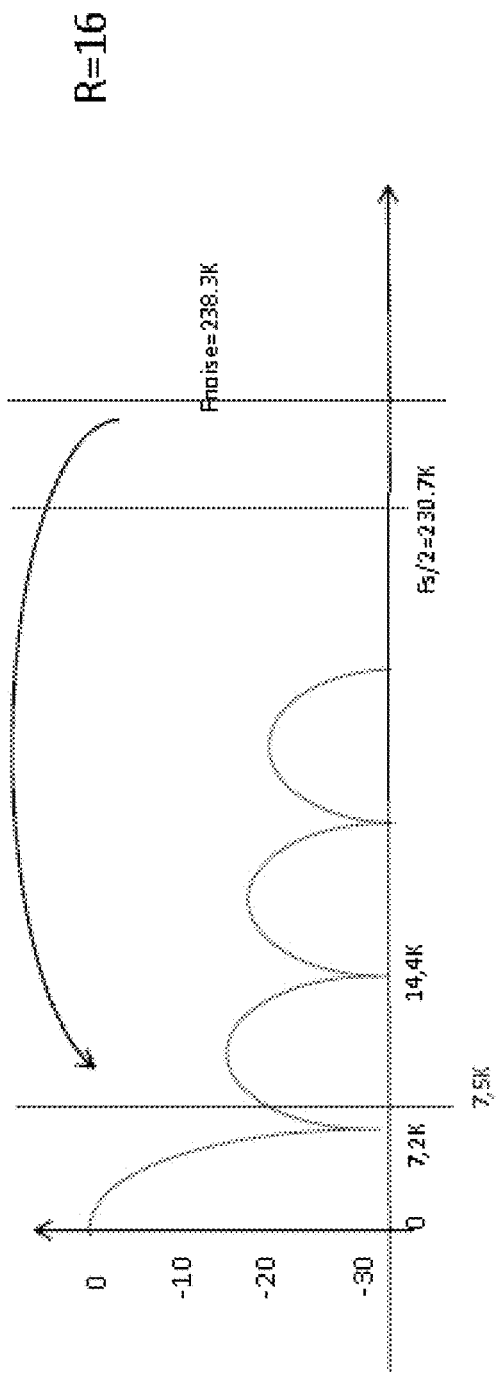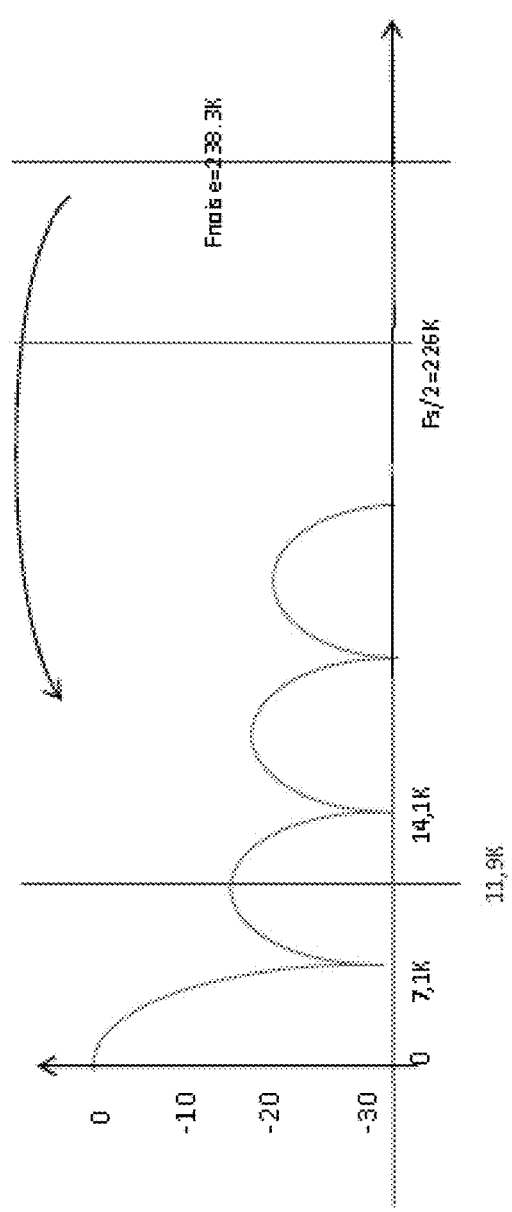

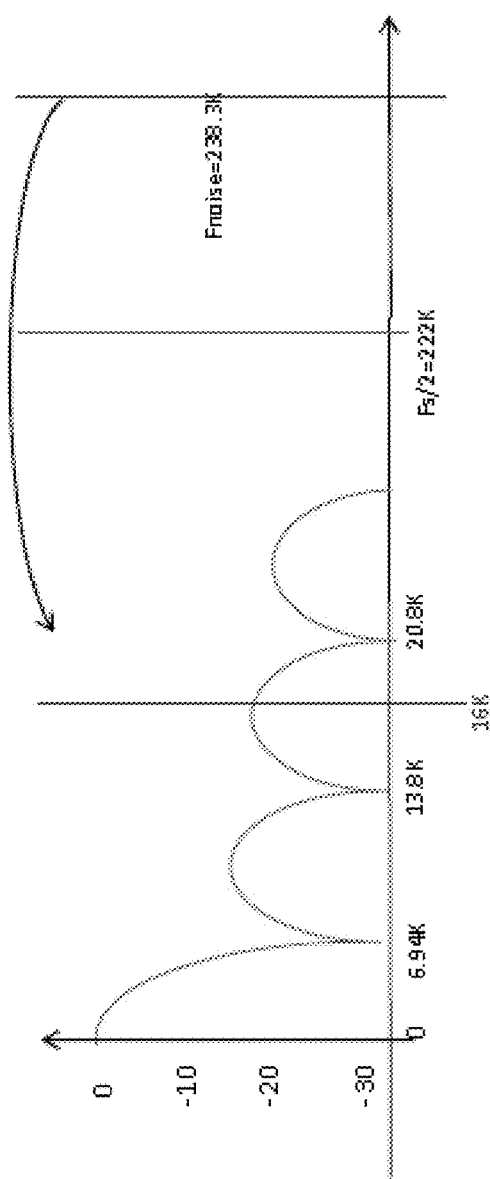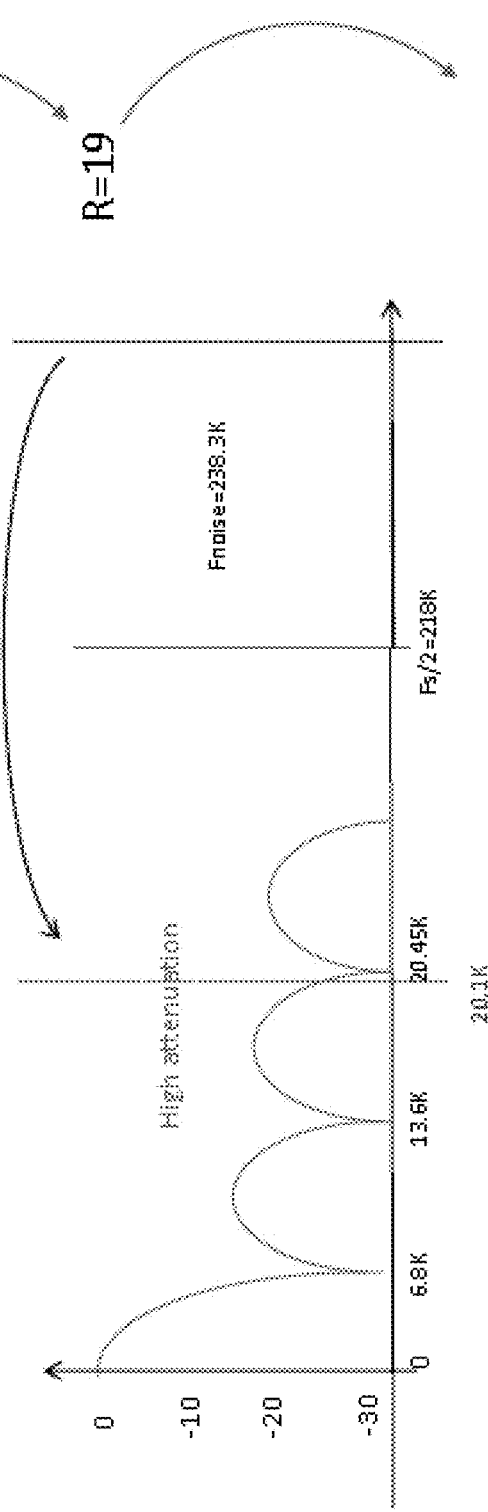

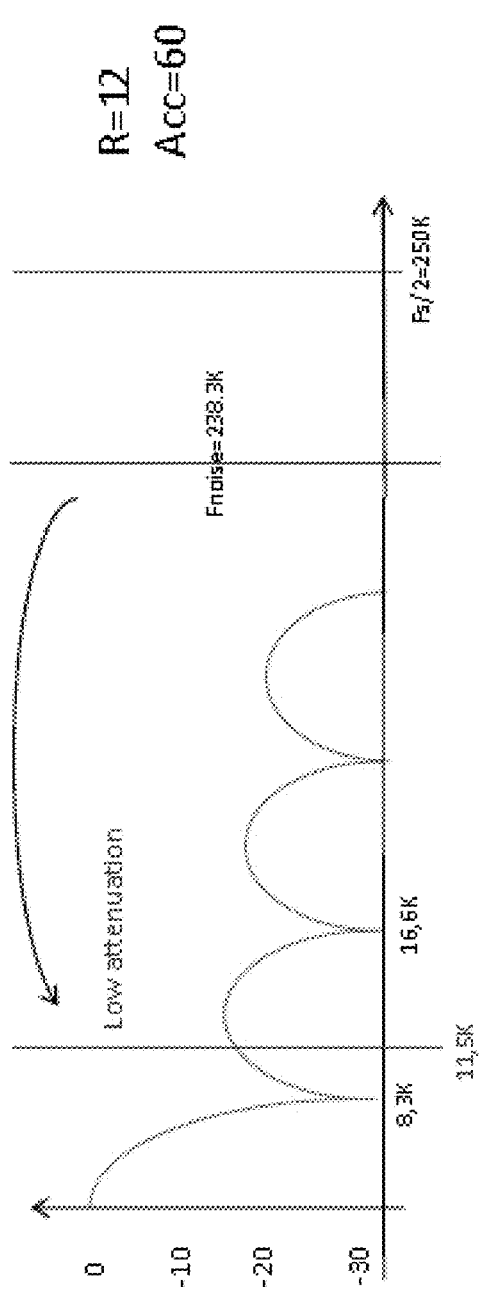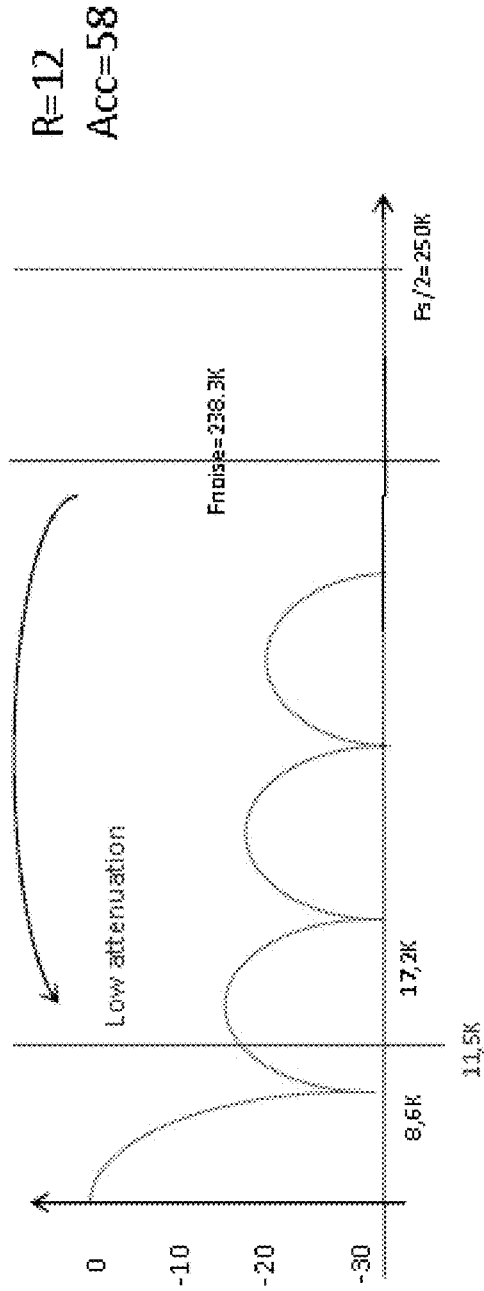
FIG. 7C
FIG. 7D

SAMPLING FREQUENCY AND ACCUMULATOR SWEEPING IN A TOUCH SCREEN CONTROLLER

TECHNICAL FIELD

The present disclosure generally relates to a capacitive touch screen controllers and, more particularly, to a frequency and accumulator sweeping technique for use in sampling a mutual capacitance.

BACKGROUND

A touch screen display is a device that can detect an object in contact therewith or in proximity thereto. The touch screen display includes display layer covered with a touch-sensitive matrix that can detect a user's touch by way of a finger or stylus, for example. Touch screen displays are used in various applications such as mobile phones, tablets, and smartwatches. A touch screen display may enable various types of user input, such as touch selection of items or alphanumeric input via a displayed virtual keypad. Touch screen displays can measure various parameters of the user's touch, such as the location, duration, etc.

One type of touch screen display is a capacitive touch screen. A capacitive touch screen may include a matrix of conductive rows and columns overlaid on the display layer forming mutual capacitance sensors. In mutual capacitance sensors, a mutual capacitance at the intersection of each row and column of the matrix may be sensed. A change in mutual capacitance between a row and a column may indicate that an object, such as a finger, is touching the screen or is in proximity to the screen near the region of intersection of the row and column.

Touch screen displays employing mutual capacitance sensors employ a "forcing" signal that is applied to a column conductor of the capacitive touch matrix. A sensing of the coupled signal on respective row conductors is made to detect change in the mutual capacitance. Since the capacitance change caused by a finger is small, noise reduction is important in achieving satisfactory operation. One known source of noise is external noise injected from the environment. In order to achieve a high signal-to-noise ratio (SNR), this source of noise must be taken into account. The power of such external noise sources is often concentrated in a few harmonics.

While techniques exist for compensating for the introduced noise, the compensation provided may not be sufficient. A need accordingly exists in the art for the development of techniques for compensating for the introduced noise.

SUMMARY

A circuit described herein includes a charge to voltage converter circuit having an input coupled to receive a sense signal from a sense node associated with a mutual capacitance to be sensed, and an output. A reset switch is coupled between the output of the charge to voltage converter circuit and the input of the charge to voltage converter. An accumulator circuit is configured to accumulate voltages at the output of the charge to voltage converter circuit and to generate an accumulator output signal. Control circuitry is configured to generate control signals for the reset switch and accumulator circuit so as to reduce noise in the accumulator output signal.

The control signals for the reset switch define a sampling frequency for the accumulator circuit, and the accumulator circuit accumulates the voltages at the output of the charge to voltage converter according to the sampling frequency. The sampling frequency is based on a clock frequency, a counter time of the control signals for the reset switch, and a convergence counter time of the charge to voltage converter circuit.

A transfer function of the charge to voltage converter circuit has notches at frequency positions dependent upon the sampling frequency, and the control signals for the reset switch serve to shift the frequency positions of the notches.

The control signals for the reset switch define a sampling frequency for the accumulator circuit, and the accumulator circuit accumulates the voltages at the output of the charge to voltage converter according to the sampling frequency. The sampling frequency is based on a clock frequency, a counter time of the control signals for the reset switch, and a convergence counter time of the charge to voltage converter circuit.

A transfer function of the charge to voltage converter circuit has notches at frequency positions dependent upon the sampling frequency, and the control signals for the reset switch serve to shift the frequency positions of the notches.

The control circuitry is configured, where the sense signal includes noise but not a desired signal component, to modify the control signals so as to sweep the sampling frequency across a range of frequencies, monitor output of the accumulator circuit as the sampling frequency is swept, and select the sampling frequency at which the output of the accumulator circuit is minimized.

The accumulator circuit accumulates the voltages at the output of the charge to voltage converter a given number of times at each sampling frequency. A transfer function of accumulator circuit has notches at frequency positions dependent upon the given number of times the accumulator circuit accumulates the voltages at the output of the charge to voltage converter at each sampling frequency. The control signals serve to change the given number of times so as to shift the notches in the transfer function of the accumulator circuit toward the sampling frequency.

A frequency of each notch is based on a sampling frequency, the changed given number of times the accumulator circuit accumulates the voltages at the output of the charge to voltage converter, and a harmonic number of that notch.

The control circuitry is configured to, where the sense signal includes noise but not a desired signal component, monitor the accumulated voltages at each accumulation as the accumulator circuit accumulates the voltages the given number of times, and select a number of accumulations at which the accumulated voltages, compensated for the number of accumulations, are minimized.

The accumulator circuit may be a cascaded integrator-comb. In addition, a compensation circuit may be coupled to the accumulator circuit and configured to compensate the accumulated voltages for the given number of times the accumulator circuit accumulates the voltages at the output of the charge to voltage converter at each sampling point, as changed by the control signals.

An analog to digital converter circuit may be configured to convert the accumulated voltages to an output digital value indicative of the sensed mutual capacitance.

A method aspect includes sampling a sense signal from a sense node associated with a mutual capacitance to be sensed, using a charge to voltage converter circuit reset every R periods of a clock signal. The method further includes accumulating voltages at an output of the charge to voltage converter N times per each R period so as to generate an accumulator output signal, using an accumulator circuit. The charge to voltage converter circuit is controlled so as to change R, and the accumulator circuit is controlled so as to change N, so as to reduce noise in the accumulator output signal. The control circuitry is configured, where the sense signal includes noise but not a desired signal component, to modify the control signals so as to sweep the sampling frequency across a range of frequencies, monitor output of the accumulator circuit as the sampling frequency is swept, and select the sampling frequency at which the output of the accumulator circuit is minimized.

Another aspect is directed to a touch screen controller integrated circuit. The touch screen controller integrated circuit includes a charge to voltage converter circuit having an input coupled to receive a sense signal from a sense node associated with a mutual capacitance to be sensed, and an output. A reset switch is coupled between the output of the charge to voltage converter circuit and the input of the charge to voltage converter. An accumulator circuit is configured to accumulate voltages at the output of the charge to voltage converter circuit and to generate an accumulator output signal. Control circuitry is configured to generate control signals for the reset switch and accumulator circuit so as to reduce noise in the accumulator output signal. The control signals for the reset switch define a number of cycles per reset R of the reset switch, thereby determining a sampling frequency for the accumulator circuit. The control signals for the accumulator circuit define a number of accumulations N per each R period.

BRIEF DESCRIPTION OF THE DRAWINGS

FIGS. 6A-6I show locations of sampling points along a comb filtering as the sampling frequency is swept.
FIGS. 7A-7F show locations of sampling points along a comb filtering as the number of accumulations is swept.

DETAILED DESCRIPTION

Figure 1:
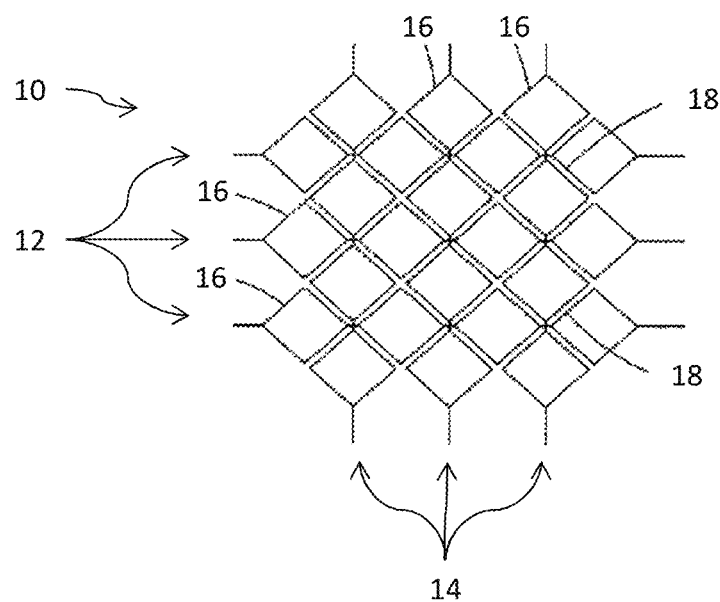
FIG. 1 illustrates a portion of a capacitive touch matrix.

The same elements have been designated with the same reference numerals in the different drawings. In particular, the structural and/or functional elements common to the different embodiments may be designated with the same reference numerals and may have identical structural, dimensional, and material properties. For clarity, those steps and elements which are useful to the understanding of the described embodiments have been shown and will be detailed.

Reference is now made to FIG. 1 showing a portion of a capacitive touch matrix 10 comprising a plurality of conductive rows 12 and plurality of conductive columns 14. Each row 12 and column 14 is formed by a plurality of serially connected diamond shaped regions 16 forming a conductive line or trace. The conductive rows 12 and the conductive columns 14 cross above or below each other at intersection points, but are not in electrical contact with one another. Because of the diamond pattern, the conductive rows 12 and the conductive columns 14 are separated from each other by capacitive gaps 18. The diamond pattern may provide decreased capacitance between conductive rows 12 and conductive columns 14. Capacitive touch matrix 10 may sense an object that modifies the fringing electric field above the capacitive gaps 18 when the object is in contact or in proximity to the matrix 10.

Figure 2:
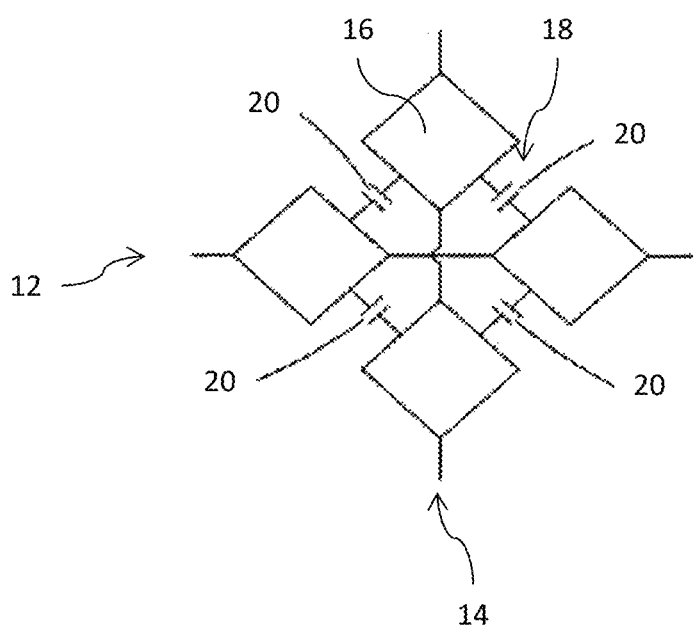
FIG. 2 illustrates a mutual capacitance intersection in the matrix.

FIG. 2 shows that when a conductive row 12 and a conductive column 14 are selected, the total capacitance of a capacitor (reference 70, FIG. 4) between row and column conductors is the sum of four capacitances 20 between the four adjacent diamond-shaped regions 16 of the selected row and column. The mutual capacitance of the capacitor between the selected row 12 and column 14 conductors can be sensed to determine whether an object is in contact with or in proximity to the matrix 10 above the region in which the four capacitances 20 are formed. Each conductive row 12 and conductive column 14 of the capacitive touch matrix 10 may be selected in succession to sense the capacitances at each intersection position of the touch matrix.

Figure 3:
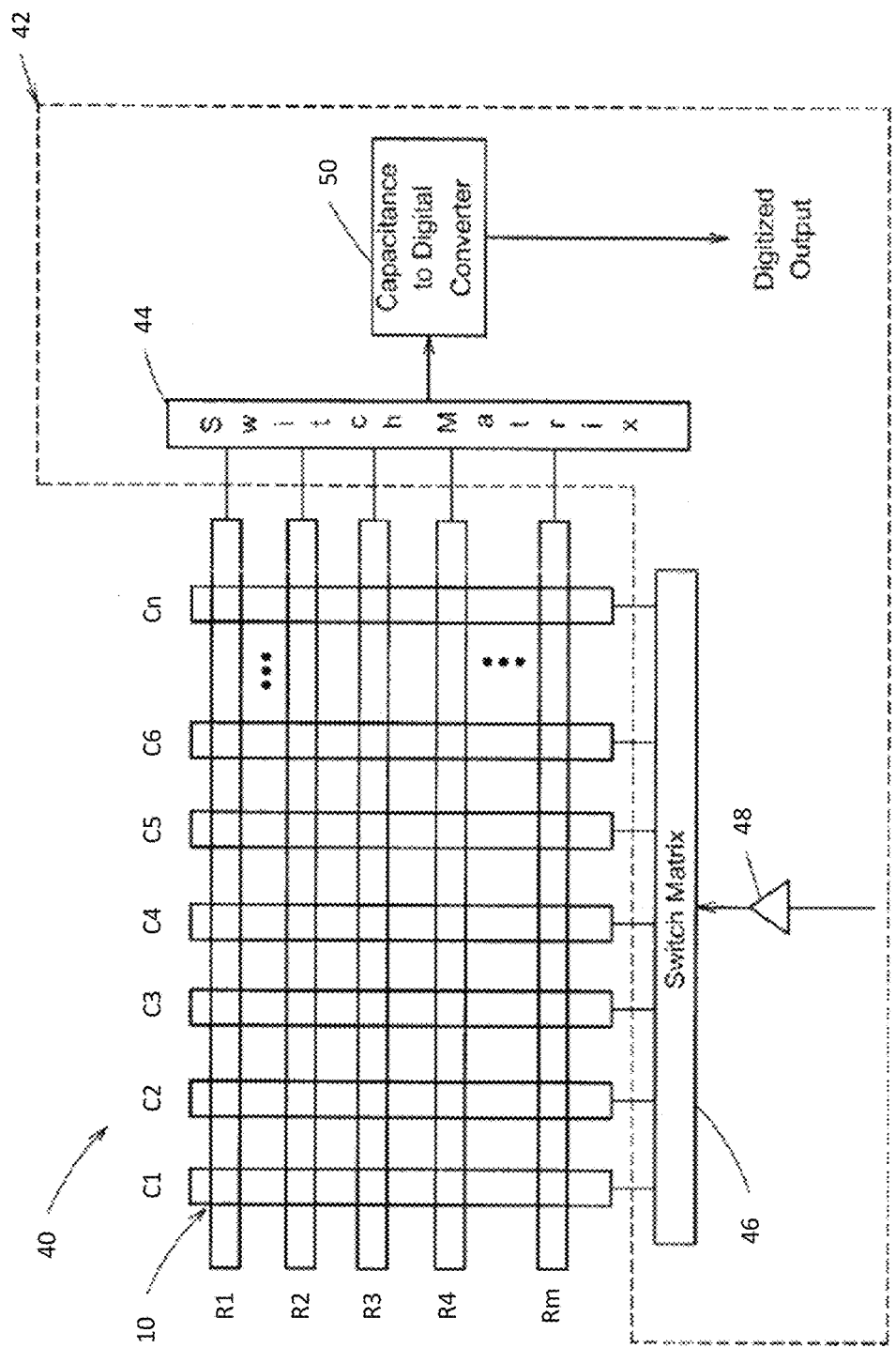
FIG. 3 is a block diagram of a touch screen system.

FIG. 3 is a block diagram of a touch screen system 40 that includes the capacitive touch matrix 10 and an associated touch screen controller 42. As discussed above, the capacitive touch matrix 10 may utilize diamond shaped regions for the row and column conductors, although it should be appreciated that any suitable shaped could be used. Such structures are not shown in FIG. 3 for reasons of clarity. Instead, the conductive rows (R1-Rm) 12 and conductive columns (C1-Cn) 14 are more simply illustrated as intersecting conductor line segments. The touch screen controller 42 includes a row switch matrix 44 and a column switch matrix 46 for selection of rows and columns of the capacitive touch matrix, such selection being made to select a particular mutual capacitance within the matrix 10 for sensing. The column switch matrix 46 receives a force signal generated by a force driver 48 and selectively applies the force signal in a sequential manner to each of the columns 14. The row switch matrix 44 sequentially selects one or more of the rows 12 for connection to a capacitance-to-digital converter circuit 50 that operates to sense charge of the mutual capacitance for the capacitors in the capacitive touch matrix 10 and convert that sensed charge to a digital value for output.

Figures 4, 4A:
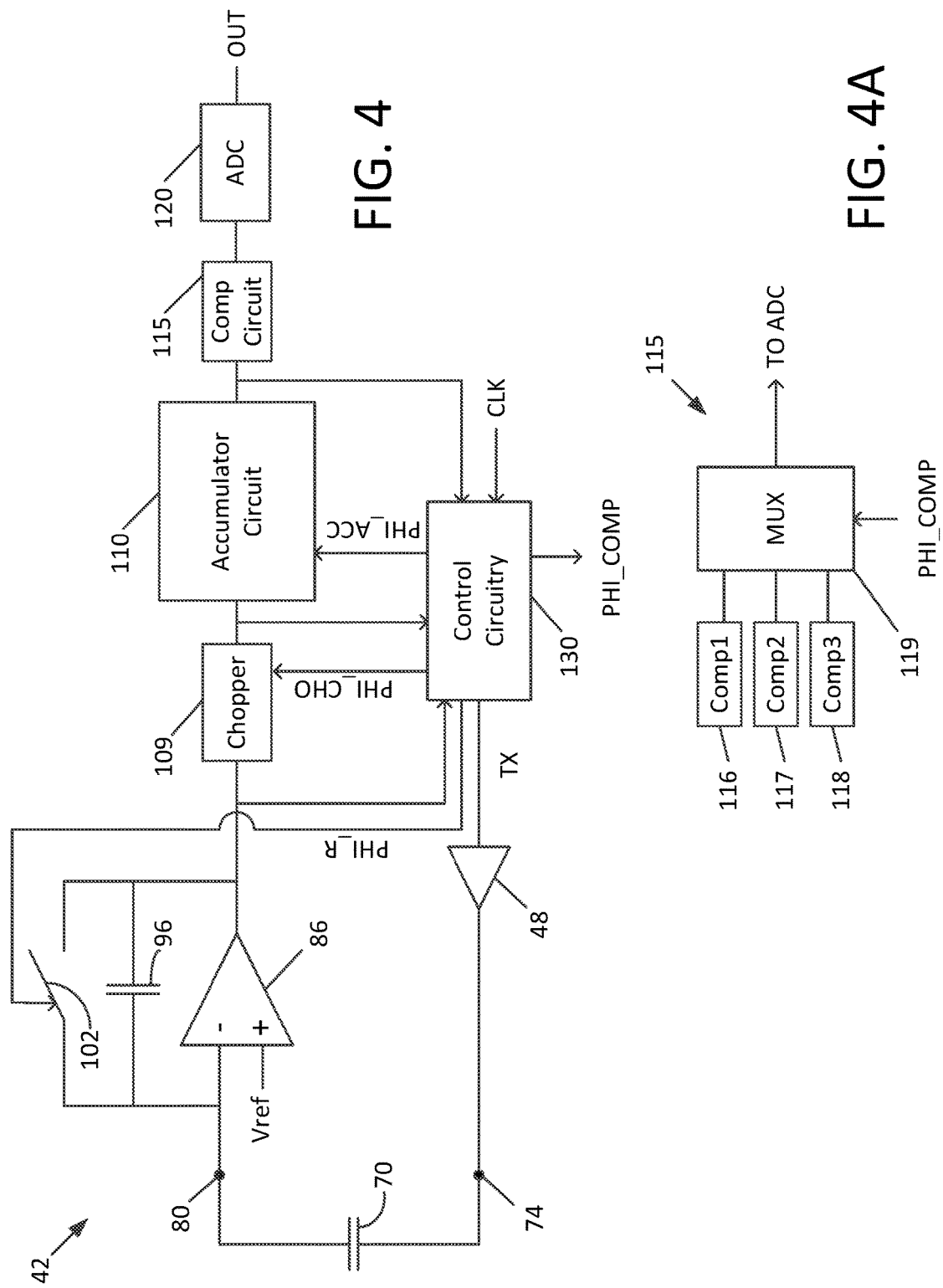
FIG. 4 illustrates details of a touch screen controller.
FIG. 4A is a block diagram of the compensation circuit of FIG. 4.

Additional reference is now made to FIG. 4 showing details of the touch screen controller 42. For simplification of the illustration, details of the row switch matrix 44 and column switch matrix 46 for selecting a particular capacitor 70 in the matrix 10 at a selected row 12s and selected column 14s are omitted. The force driver 48 receives a transmit signal TX and applies a force signal to a force node 74 associated with the column 14s of the selected capacitor 70. The transmit signal TX is an alternating current (AC) signal having an frequency. In an embodiment, the transmit signal TX is a square wave signal. The force signal 72 is accordingly also an AC signal, with a corresponding frequency, that is coupled through the selected capacitor to generate a sense signal output from a sense node 80 associated with the row 12s of the selected capacitor 70.

A charge to voltage (C2V) converter circuit 86 includes an integrator circuit formed by an operational amplifier 86 having a first input, a second input, and an output. An integrating capacitor 96 coupled is between the output and the first input. A reference voltage (Vref) is applied to the second input of the operational amplifier 86. A reset switch 102 is coupled between the output and the first input in parallel with the integrating capacitor 96. Opening and closing of the reset switch 102 is controlled by a control signal PHI_R. The reset switch 102 may, for example, be implemented as a transistor device, such as a MOSFET.

The charge to voltage converter circuit 86 integrates charge from the sense signal output from the sense node 80. The charge to voltage converter circuit 86 and generates a voltage at its output whose offset from the reference voltage Vref is indicative of the sensed mutual capacitance at capacitor 70. Thereafter, the control signal PHI_R transitions to a first logic state configured to close the reset switch 102 and short across the integrating capacitor 96. This results in a resetting of the charge to voltage converter circuit 86, which drives the voltage at the output to equal the reference voltage Vref.

The touch screen controller 42 further includes an accumulator circuit 110 (such as a cascaded integrator-comb) having an input coupled to the output of the charge to voltage converter circuit 86 by a chopper 109. Operation of the chopper 109 is controlled by a control signal PHI_CHO. The accumulator circuit 110 receives the voltage generated at the output of the chopper 109. The control signal PHI_CHO is timed to close the switch 112 just before a time when the control signal PHI_R closes the reset switch 102. Thus, the accumulator circuit 110 receives the integrated voltage that is indicative of the sensed mutual capacitance at capacitor 70. The voltages output from the charge to voltage converter circuit 86 are accumulated by the accumulator circuit 110 over a plurality of accumulation cycles N.

The signal output by the accumulator circuit 110 is compensated and normalized for the number of number accumulation cycles N by a compensation circuit 115. The touch screen controller 42 still further includes an analog to digital (A/D) converter circuit 120 having an input coupled to an output of the compensation circuit 115. The A/D converter circuit 120 converts the sampled and compensated accumulated voltage and generates a corresponding digital signal.

The compensation circuit 115, as shown in FIG. 4A, includes a multiplexer 119 that has inputs coupled to a plurality of compensation sub-circuits 116-118, and is controlled by the control signal PHI_COMP. The selection of an input corresponds to the number of accumulation cycles N performed.

Control circuitry 130 generates the control signals PHI_R, PHI_CHO, PHI_COMP and PHI_ACC with the appropriate logic states and timings in order to effectuate the operations described above. The control circuit 130 may comprise a logic circuit. The control circuitry 130 may, more specifically, comprise a logic circuit, programmable logic, a microcontroller or a microprocessor circuit appropriately designed or programmed to generate the control signals. The control circuitry 130 is further configured to generate the transmit signal TX.

In operation, the control circuitry 130 generates the control signals PHI_R, PHI_CHO, and PHI_ACC for the reset switch and accumulator circuit so as to reduce noise in the accumulator output signal. The control signal PHI_R for the reset switch 102 defines a sampling frequency for the accumulator circuit 86. In more detail, this sampling frequency is based on the clock frequency of the system CLK_Frequency, a counter time R of the control signal PHI_R, and a convergence counter time C2V_conv_time of the charge to voltage converter circuit 86 itself. The sampling frequency Fs may be calculated as:

$$Fs = CLK\_Frequency/(C2V\_conv\_time * R).$$

Figure 5:
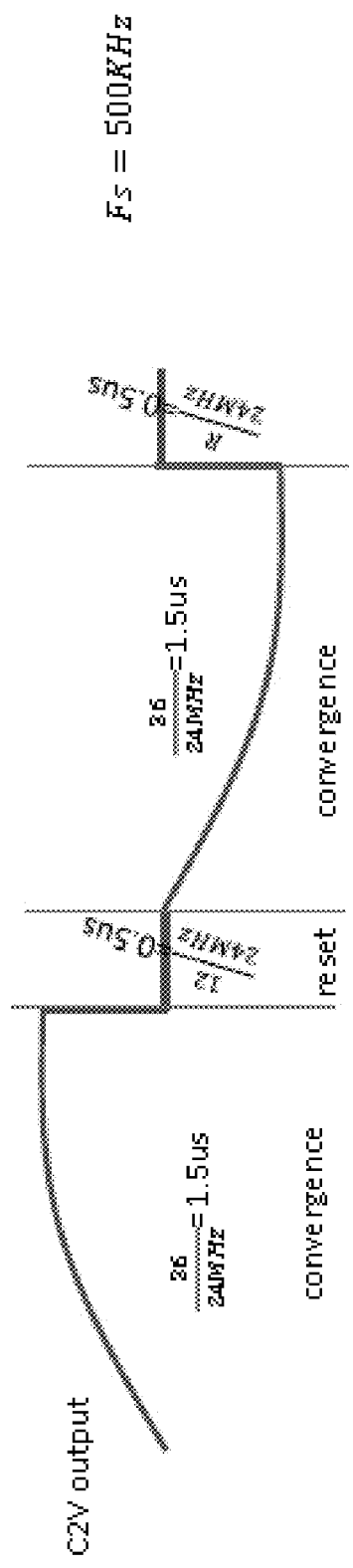
FIG. 5 shows sample output from the charge to voltage converter of FIG. 3.
Figure 6A:
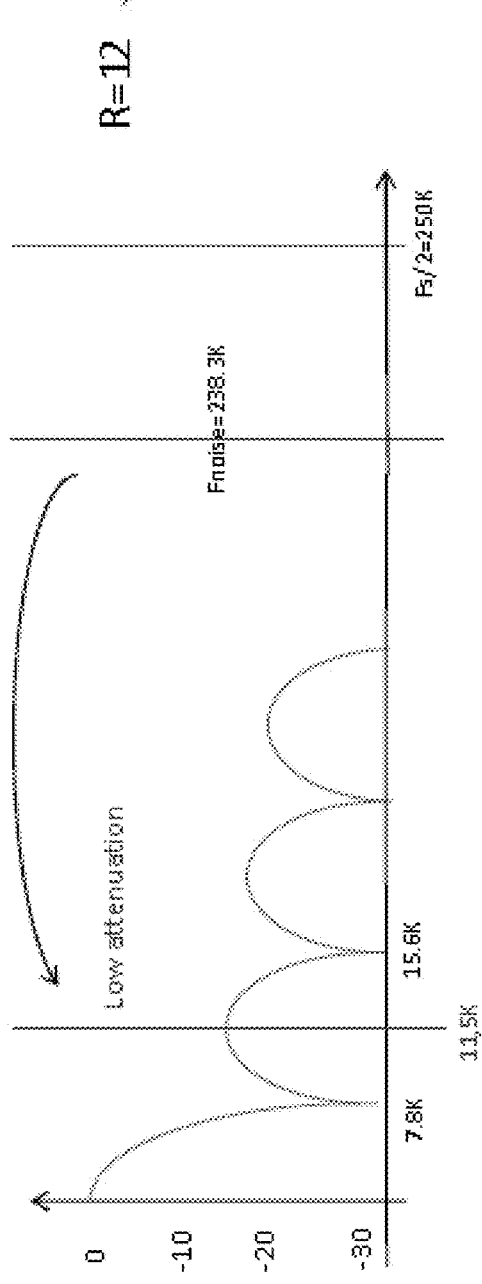
Figure 6B:
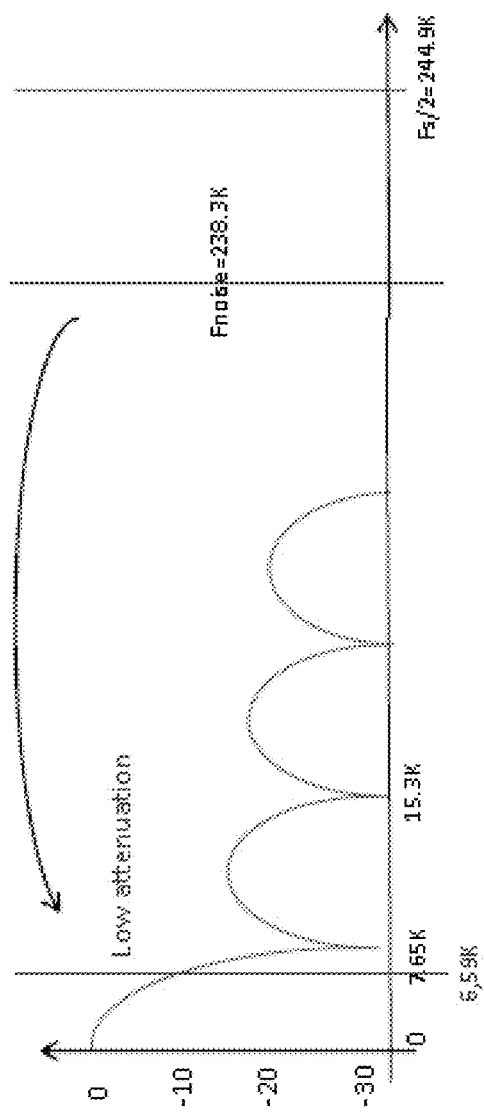
Figure 6C:
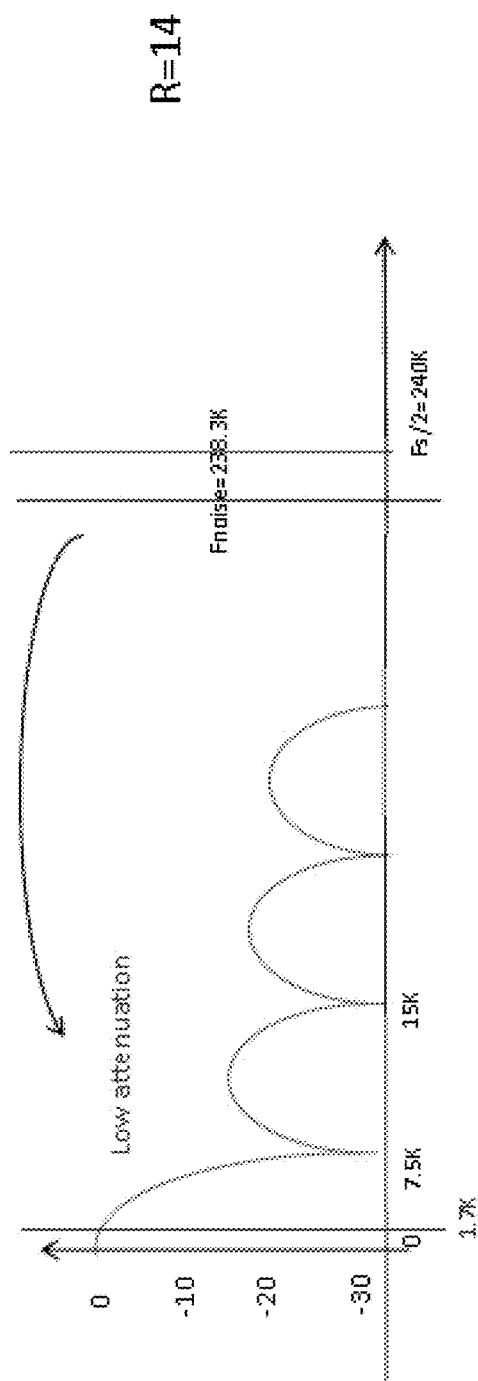
Figure 6D:
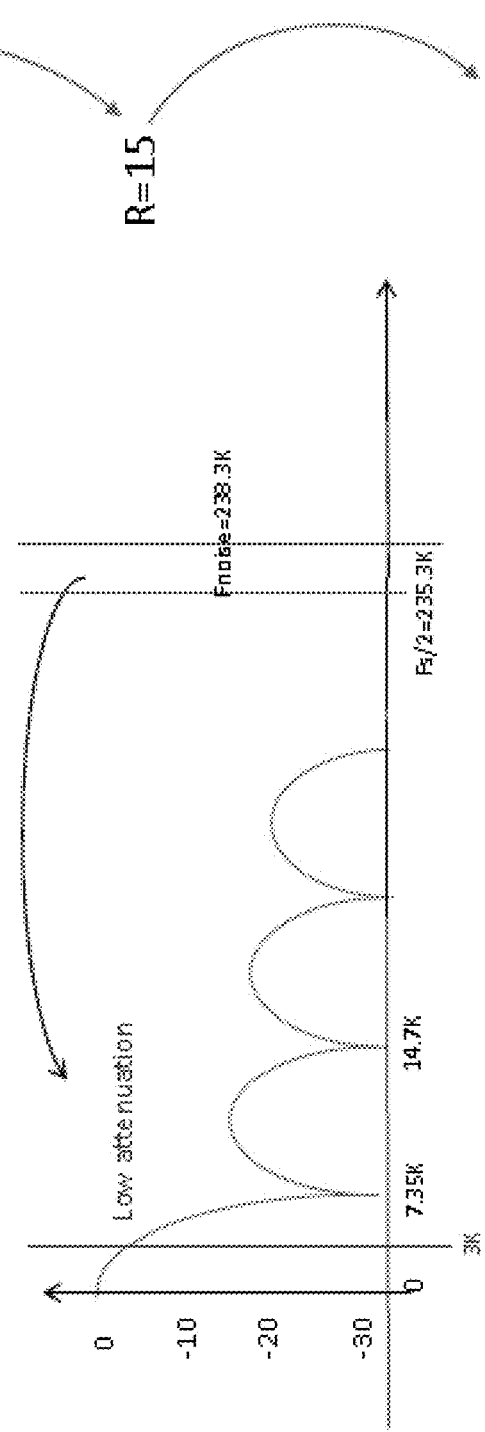
Figure 6I:
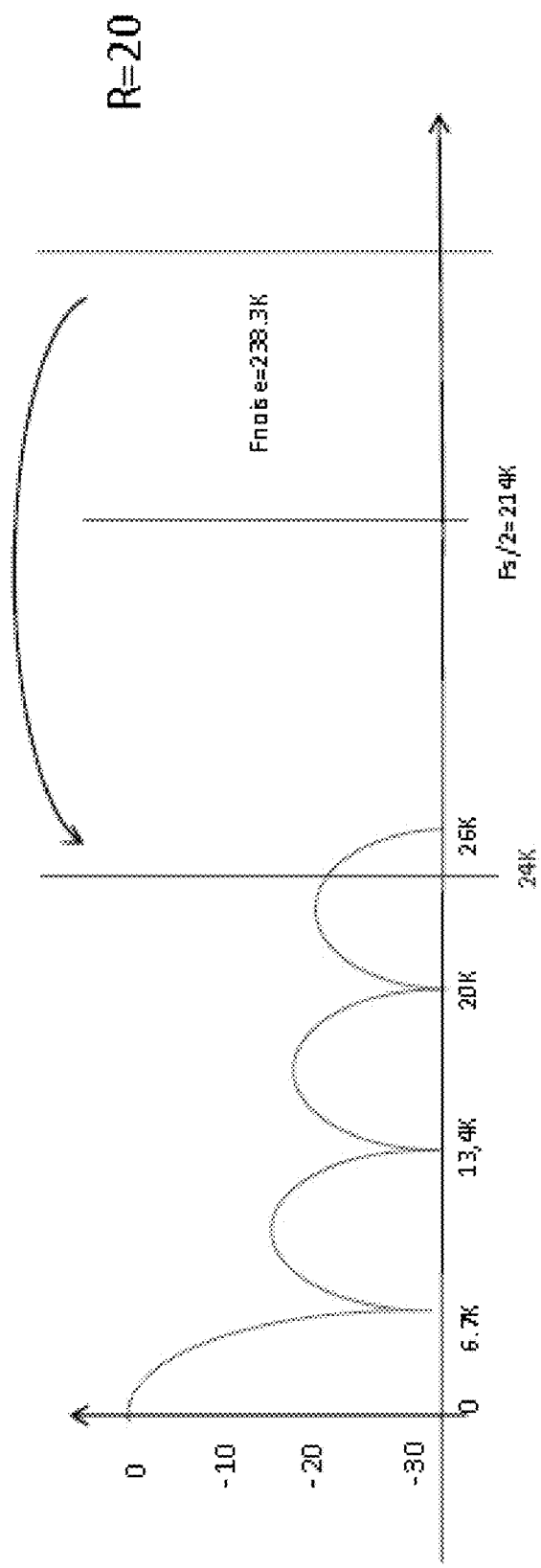
Figure 7A:
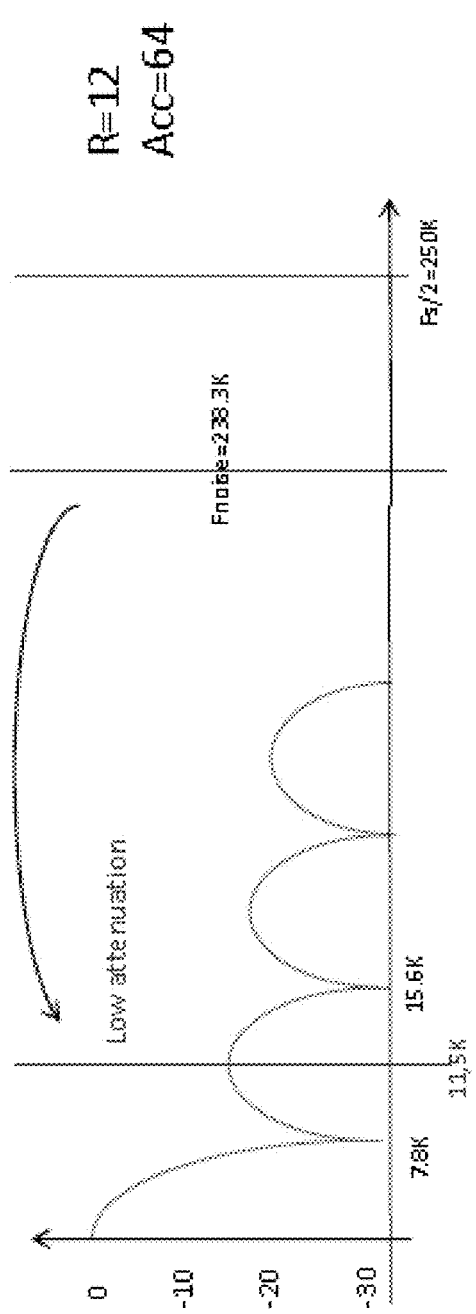
Figure 7B:
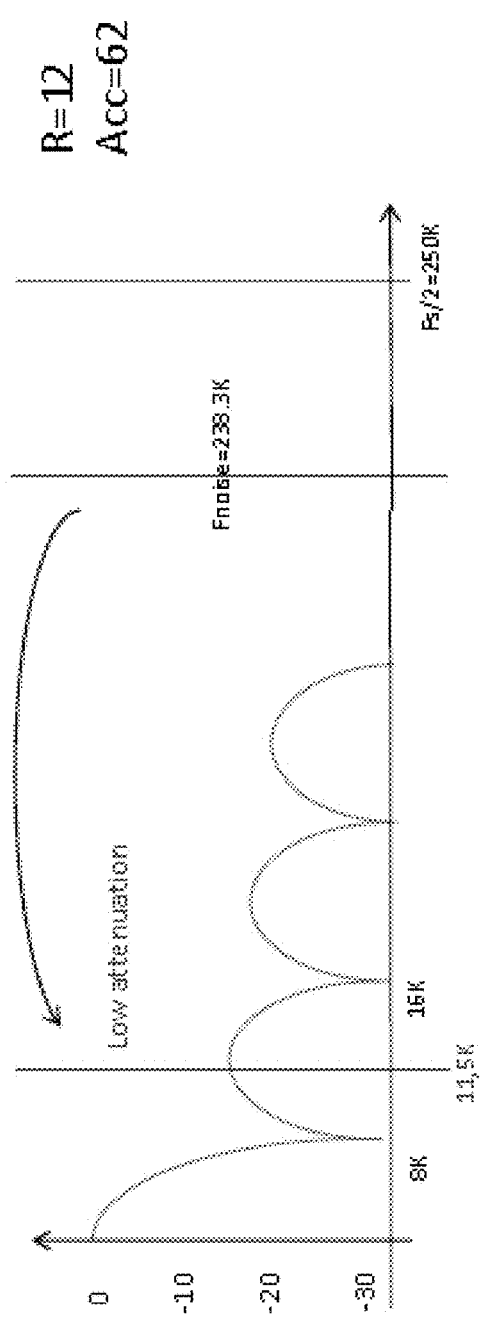
Figure 7E:
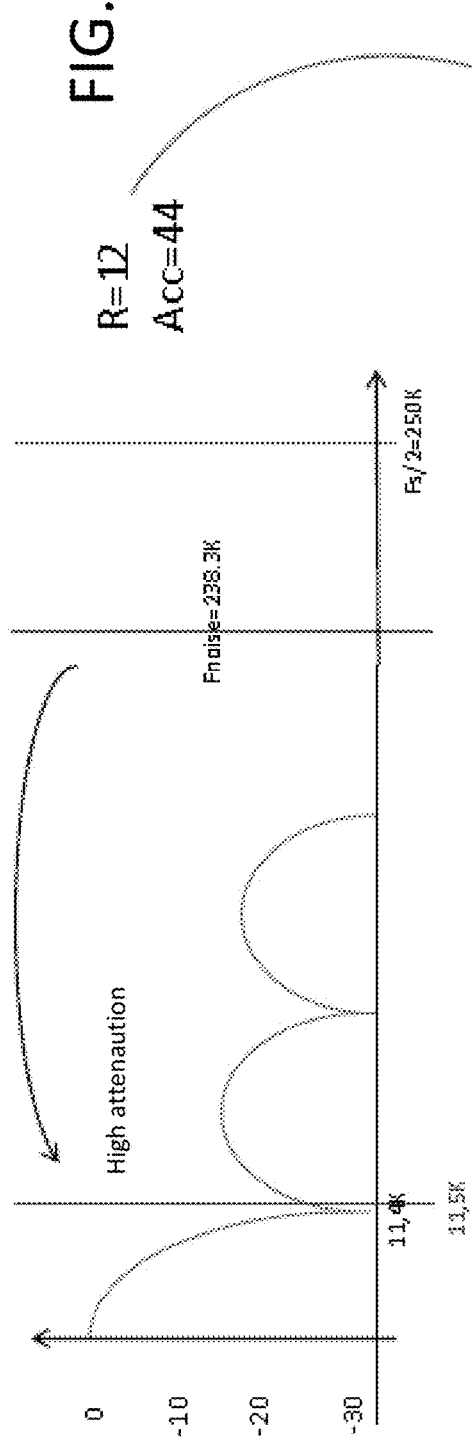
Figure 7F:
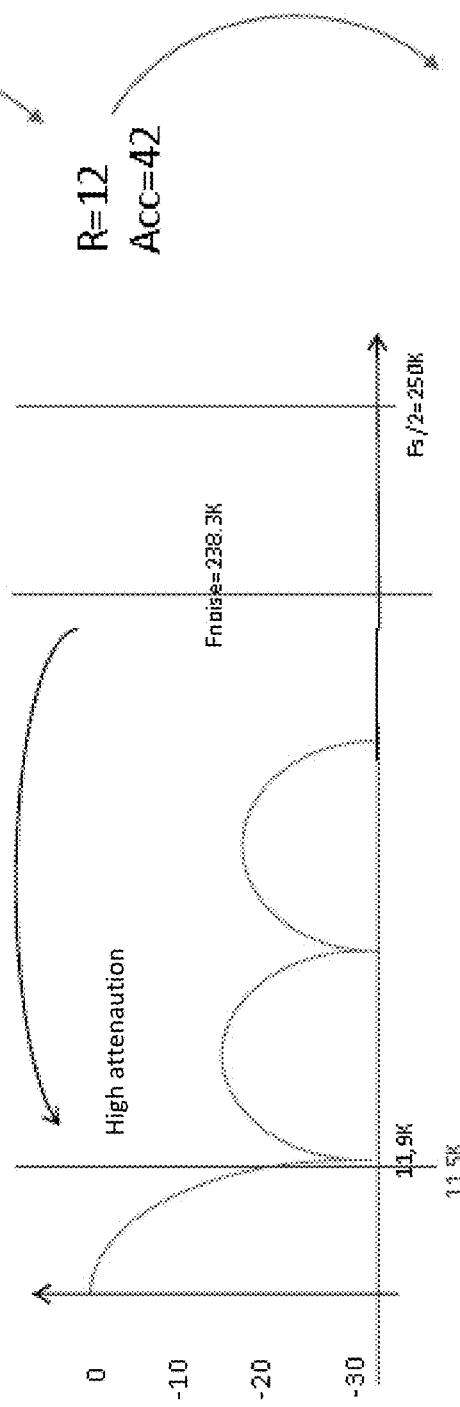

Sample output of the charge to voltage converter circuit 86 that shows the convergence counter time and resets, together with sample calculations of the sampling frequency Fs, is shown in FIG. 5.

The accumulator circuit 110 has a transfer function associated therewith that results in performance of a comb filtering. This transfer function has notches at certain frequencies and thus serves to block signals at those frequencies. As should be understood, the sense signal output at node 80 includes a desired signal component (which represents touch data) and a noise component. The noise component is time varying, while the desired signal component (on the time scales being investigated for touch sensing) is constant. To filter out the noise component, it is desirable to sample the sense signal at a sampling frequency that is in one of the notches of the comb filtering element, or as close as possible to one of the notches of the comb filtering element.

To that end, the touch screen controller 42 may operate in a calibration mode so as to find a desirable sampling frequency to reduce detected noise. In the calibration mode, the touch screen controller 42 may be set such that the sense signal output at node 80 does not include the desired signal component, and thus merely includes the noise. Since the sampling frequency Fs is based on R, the control circuitry 130 can, in the calibration mode, therefore be swept across a range of R values in an attempt to find an output from the accumulator circuit 110 that is lower in noise than others. As an example, shown in FIG. 6A-6I, different values of R result in different sampling frequencies, which in turn moves the location of the notches. Where the sampling frequency is near a notch, the attenuation of the noise is greater than where the sampling frequency is farther away from a notch.

The control circuitry 130 monitors the output of the accumulator circuit 110 as the value of R is swept, and determines at which value of R the output is the lowest, and thus at which attenuation of the noise is the highest. The value of R at which the output of the voltage converter circuit 86 is the lowest is noted by the control circuitry 130. In the sample sweep shown in FIGS. 6A-6I, the R value of 19 is shown to result in the most attenuation of the noise as it is the closest to a notch.

However, in some instances, there may be no R value that sets the sampling frequency Fs such that the sampling frequency is in a notch of the notch filter. Therefore, the filtering performed by the accumulator circuit 110, as will be explained below, may be adjusted so as to perform a further filtering.

As explained, the voltages output from the charge to voltage converter circuit 86 are accumulated by the accumulator circuit 110 over N accumulation cycles. That is, at each sampling point, N accumulations are performed. The notches of the transfer function of the accumulator circuit 110 are positioned at each harmonic number and a function of the current value of N and the sampling frequency Fs. Mathematically, this can be represented as:

$$Notch\_Frequency = Harmonic * Fs/N.$$

Thus, where N is 5, for example, the first notch would be at Fs/5, the second notch would be at 2Fs/5, the third notch would be at 3Fs/5, etc.

As can be seen from the above, for a given sampling frequency Fs, the location of the notches are based on N. Therefore, the locations of the notches themselves can be altered by changing N, with the aim being to move the notches such that the sampling points are in the notches. To that end, when in the calibration mode, the control circuitry 130 can sweep N across a range of values. This is performed by simply accumulating a number of times N equal to the top of the range of values to sweep across, and examining the result of each accumulation. At the end of the sweep, the accumulation number that resulted in the lowest signal being output from the accumulator circuit 110 is selected.

In the sample sweep shown in FIGS. 7A-7F, for an R value of 12, the N value of 42 is shown to result in the lowest signal being output from the accumulator circuit 110, and thus the greatest attenuation of the noise.

Figure 8:
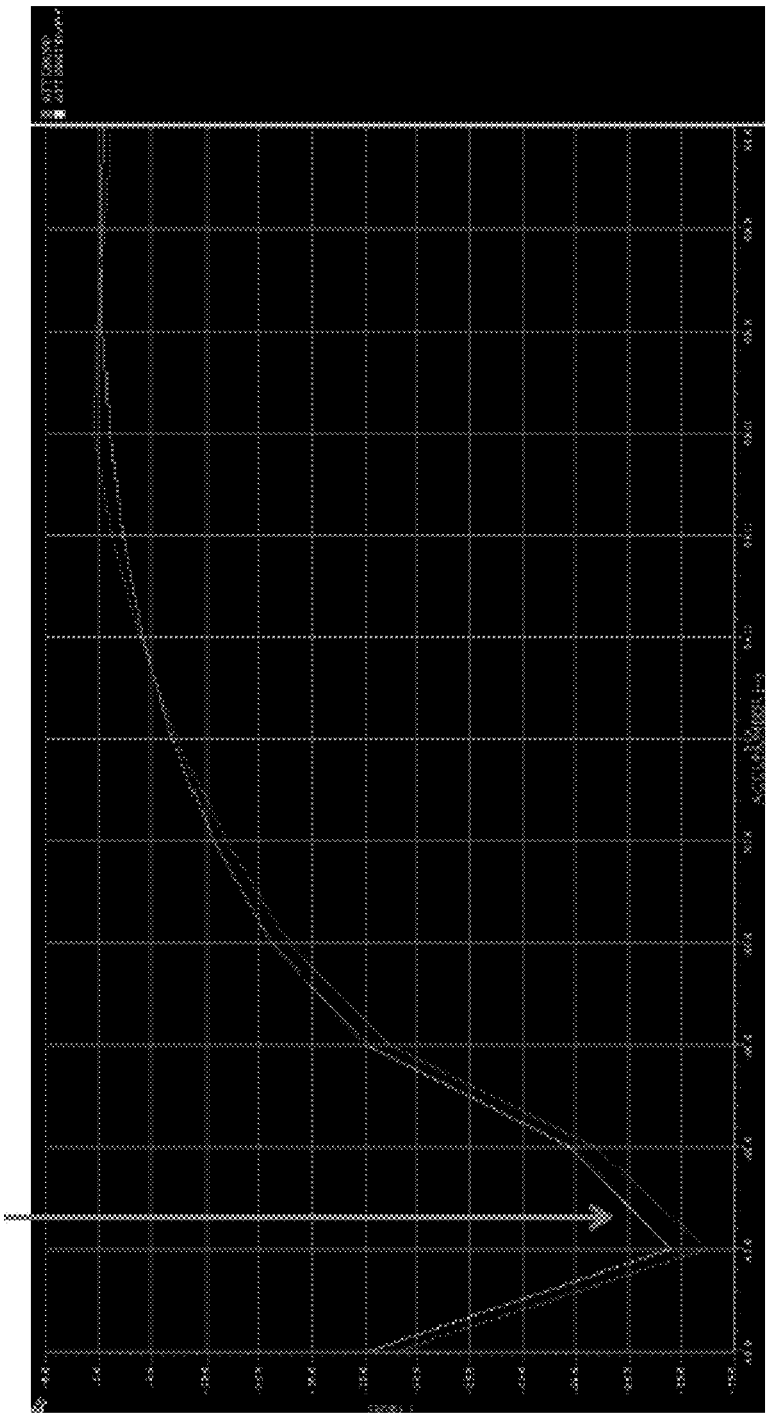
FIG. 8 shows sample accumulator output after preferred values for the sampling frequency and number of accumulations are determined.

Now that suitable values of R and N have been found, the touch screen controller 42 switches into a normal mode of operation, in which the control circuit 110 controls the switch 102 so that R is set to the determined value from the calibration mode, and controls the accumulator circuit 110 so that N is set to the determined value from the calibration mode. As shown in FIG. 8, for the example above where R and N have been determined as 12 and 42 respectively, a large degree of noise attenuation is obtainable.

Various embodiments have been described. Various alterations, modifications, and improvements will readily occur to those skilled in the art. Further, the practical implementation of the embodiments which have been described is within the abilities of those skilled in the art based on the functional indications given hereabove.

The invention claimed is:

1. A circuit, comprising:
   a charge to voltage converter circuit having an input coupled to receive a sense signal from a sense node associated with a mutual capacitance to be sensed, and an output;
   a reset switch coupled between the output of the charge to voltage converter circuit and the input of the charge to voltage converter;
   an accumulator circuit configured to accumulate voltages at the output of the charge to voltage converter circuit and to generate an accumulator output signal;
   control circuitry configured to generate control signals for the reset switch and accumulator circuit so as to reduce noise in the accumulator output signal, wherein the control signals for the reset switch define a sampling frequency for the accumulator circuit;
   wherein the accumulator circuit accumulates the voltages at the output of the charge to voltage converter according to the sampling frequency;
   wherein the accumulator circuit accumulates the voltages at the output of the charge to voltage converter a given number of times at each sampling frequency;
   wherein a transfer function of the accumulator circuit has notches at frequency positions dependent upon the given number of times the accumulator circuit accumulates the voltages at the output of the charge to voltage converter at each sampling frequency; and
   wherein the control signals serve to change the given number of times so as to shift the notches in the transfer function of the accumulator circuit toward the sampling frequency.

2. The circuit of claim 1, wherein the sampling frequency is based on a clock frequency, a counter time of the control signals for the reset switch, and a convergence counter time of the charge to voltage converter circuit.

3. The circuit of claim 1, wherein a transfer function of the charge to voltage converter circuit has notches at frequency positions dependent upon the sampling frequency; and wherein the control signals for the reset switch serve to shift the frequency positions of the notches.

4. The circuit of claim 3, wherein the control circuitry is configured, where the sense signal includes noise but not a desired signal component, to:
   modify the control signals so as to sweep the sampling frequency across a range of frequencies;
   monitor the accumulator output signal as the sampling frequency is swept; and
   select the sampling frequency at which the accumulator output signal is minimized.

5. The circuit of claim 1, wherein a frequency of each notch is based on the sampling frequency, the changed given number of times the accumulator circuit accumulates the voltages at the output of the charge to voltage converter, and a harmonic number of that notch.

6. The circuit of claim 5, further comprising a compensation circuit coupled to the accumulator circuit and configured to compensate the accumulated voltages for the given number of times the accumulator circuit accumulates the voltages at the output of the charge to voltage converter at each sampling point, as changed by the control signals.

7. The circuit of claim 6, further comprising an analog to digital converter circuit configured to convert the accumulated voltages to an output digital value indicative of the sensed mutual capacitance.

8. A circuit, comprising:
   a charge to voltage converter circuit having an input coupled to receive a sense signal from a sense node associated with a mutual capacitance to be sensed, and an output;
   a reset switch coupled between the output of the charge to voltage converter circuit and the input of the charge to voltage converter;
   an accumulator circuit configured to accumulate voltages at the output of the charge to voltage converter circuit and to generate an accumulator output signal;
   control circuitry configured to generate control signals for the reset switch and accumulator circuit so as to reduce noise in the accumulator output signal, wherein the control signals for the reset switch define a sampling frequency for the accumulator circuit;
   wherein the accumulator circuit accumulates the voltages at the output of the charge to voltage converter according to the sampling frequency;
   wherein the accumulator circuit accumulates the voltages at the output of the charge to voltage converter a given number of times at each sampling frequency; and
   wherein the control circuitry is configured, where the sense signal includes noise but not a desired signal component, to:
      monitor the accumulated voltages at each accumulation as the accumulator circuit accumulates the voltages the given number of times; and
      select a number of accumulations at which the accumulated voltages, compensated for the number of accumulations, are minimized.

9. The circuit of claim 8, wherein the sampling frequency is based on a clock frequency, a counter time of the control signals for the reset switch, and a convergence counter time of the charge to voltage converter circuit.

10. The circuit of claim 8, wherein the control circuitry is configured, where the sense signal includes noise but not a desired signal component, to:

modify the control signals so as to sweep the sampling frequency across a range of frequencies;

monitor the accumulator output signal as the sampling frequency is swept; and select the sampling frequency at which the accumulator output signal is minimized.

11. The circuit of claim 8, wherein a transfer function of the charge to voltage converter circuit has notches at frequency positions dependent upon the sampling frequency; and wherein the control signals for the reset switch serve to shift the frequency positions of the notches.

12. The circuit of claim 11, wherein a frequency of each notch is based on the sampling frequency and a harmonic number of that notch.

13. The circuit of claim 12, further comprising a compensation circuit coupled to the accumulator circuit and configured to compensate the accumulated voltages for the given number of times the accumulator circuit accumulates the voltages at the output of the charge to voltage converter at each sampling point, as changed by the control signals.

14. The circuit of claim 8, further comprising an analog to digital converter circuit configured to convert the accumulated voltages to an output digital value indicative of the sensed mutual capacitance.

15. A circuit, comprising:
a charge to voltage converter circuit having an input coupled to receive a sense signal from a sense node associated with a mutual capacitance to be sensed, and an output;
a reset switch coupled between the output of the charge to voltage converter circuit and the input of the charge to voltage converter;
an accumulator circuit configured to accumulate voltages at the output of the charge to voltage converter circuit and to generate an accumulator output signal;
control circuitry configured to generate control signals for the reset switch and accumulator circuit so as to reduce noise in the accumulator output signal, wherein the control signals for the reset switch define a sampling frequency for the accumulator circuit;
wherein the accumulator circuit accumulates the voltages at the output of the charge to voltage converter according to the sampling frequency;
wherein the accumulator circuit accumulates the voltages at the output of the charge to voltage converter a given number of times at each sampling frequency; and
wherein the accumulator circuit comprises a cascaded integrator-comb.

16. The circuit of claim 15, wherein the sampling frequency is based on a clock frequency, a counter time of the control signals for the reset switch, and a convergence counter time of the charge to voltage converter circuit.

17. The circuit of claim 15, wherein the control circuitry is configured, where the sense signal includes noise but not a desired signal component, to:
modify the control signals so as to sweep the sampling frequency across a range of frequencies;
monitor the accumulator output signal as the sampling frequency is swept; and
select the sampling frequency at which the accumulator output signal is minimized.

18. The circuit of claim 15, wherein a transfer function of the charge to voltage converter circuit has notches at frequency positions dependent upon the sampling frequency; and wherein the control signals for the reset switch serve to shift the frequency positions of the notches.

19. The circuit of claim 18, wherein a frequency of each notch is based on the sampling frequency and a harmonic number of that notch.

20. The circuit of claim 19, further comprising a compensation circuit coupled to the accumulator circuit and configured to compensate the accumulated voltages for the given number of times the accumulator circuit accumulates the voltages at the output of the charge to voltage converter at each sampling point, as changed by the control signals.

21. The circuit of claim 15, further comprising an analog to digital converter circuit configured to convert the accumulated voltages to an output digital value indicative of the sensed mutual capacitance.

22. A method, comprising:
sampling a sense signal from a sense node associated with a mutual capacitance to be sensed, using a charge to voltage converter circuit reset every R periods of a clock signal;
accumulating voltages at an output of the charge to voltage converter N times per each R period so as to generate an accumulator output signal, using an accumulator circuit; and
controlling the charge to voltage converter so as to change R, and controlling the accumulator circuit so as to change N, so as to reduce noise in the accumulator output signal by adjusting location of notches in a transfer function of the accumulator circuit.

23. The method of claim 22, wherein, in a setup mode of operation:
the sense signal has a noise component but not a touch signal component;
the charge to voltage converter is controlled so as to sweep R over a range of values while monitoring output of the charge to voltage converter; and
a value of R is selected at which the output of the accumulator output signal is minimized.

24. The method of claim 23, wherein, also in the setup mode of operation:
the accumulator output signal is monitored over N accumulations to determine a value of N at which the accumulator output signal is minimized; and
the value of N at which the accumulator output signal is minimized is selected.

25. The method of claim 24, wherein a sampling frequency for the accumulator circuit is defined as a function of R.

26. The method of claim 25, wherein locations of the notches in the transfer function of the accumulator circuit are each harmonic of the sampling frequency divided by N.

27. The method of claim 24, wherein, in a normal mode of operation:
the charge to voltage controller is controlled so as to set R to the value at which the accumulator output signal is minimized; and
the accumulator circuit is controlled so as to set N to the value at which the accumulator output signal is minimized.

28. The method of claim 27, further comprising periodically switching from the normal mode of operation to the setup mode of operation.

29. A touch screen controller integrated circuit, comprising:
a charge to voltage converter circuit having an input coupled to receive a sense signal from a sense node associated with a mutual capacitance to be sensed, and an output;

a reset switch coupled between the output of the charge to voltage converter circuit and the input of the charge to voltage converter;

an accumulator circuit configured to accumulate voltages at the output of the charge to voltage converter circuit and to generate an accumulator output signal;

control circuitry configured to generate control signals for the reset switch and accumulator circuit so as to reduce noise in the accumulator output signal;

wherein the control signals for the reset switch define a number of cycles per reset R of the reset switch, thereby determining a sampling frequency for the accumulator circuit;

wherein the control signals for the accumulator circuit define a number of accumulations N per each R period; and wherein the accumulator circuit has a transfer function with notches at locations defined as a function of the sampling frequency and N.

30. A touch screen controller integrated circuit, comprising:

a charge to voltage converter circuit having an input coupled to receive a sense signal from a sense node associated with a mutual capacitance to be sensed, and an output a reset switch coupled between the output of the charge to voltage converter circuit and the input of the charge to voltage converter;

an accumulator circuit configured to accumulate voltages at the output of the charge to voltage converter circuit and to generate an accumulator output signal;

control circuitry configured to generate control signals for the reset switch and accumulator circuit so as to reduce noise in the accumulator output signal;

wherein the control signals for the reset switch define a number of cycles per reset R of the reset switch, thereby determining a sampling frequency for the accumulator circuit;

wherein the control signals for the accumulator circuit define a number of accumulations N per each R period; and wherein the control signals sweep R through a range of values so as to determine a preferred value of R that minimizes the accumulator output signal.

31. The touch screen controller integrated circuit of claim 30, wherein the control circuitry determines a preferred value of N for the preferred value of R that minimizes the accumulator output signal.

* * * * *